United States Patent [19]
Ohsumi et al.

[11] Patent Number: 5,264,062
[45] Date of Patent: Nov. 23, 1993

[54] PRODUCTION METHOD FOR COMPOSITE MOLDED ARTICLE

[75] Inventors: Hisayoshi Ohsumi; Takeshi Matsumoto; Shinji Kato; Mitsuo Ishizuka; Shoichi Kaneko, all of Hamamatsu, Japan

[73] Assignee: Yamaha Corporation, Japan

[21] Appl. No.: 941,734

[22] Filed: Sep. 8, 1992

[30] Foreign Application Priority Data

Sep. 6, 1991 [JP] Japan .................................. 3-227506

[51] Int. Cl.⁵ .................................................. B32B 31/12
[52] U.S. Cl. ..................................... 156/228; 156/242; 156/245; 156/306.6; 156/311; 156/313; 264/328.1; 428/308.8; 428/464; 428/537.1; 428/537.5
[58] Field of Search ............... 156/242, 245, 306.6, 156/311, 313, 228; 264/328.1; 428/106, 114, 306.6, 308.8, 464, 537.1, 537.5

[56] References Cited

U.S. PATENT DOCUMENTS

| | | | |
|---|---|---|---|
| 246,853 | 9/1881 | Woods | 428/537.1 |
| 1,744,345 | 1/1930 | Swenson | 428/537.1 |
| 1,810,281 | 6/1931 | Linse | 428/537.1 |
| 2,418,233 | 4/1947 | McClary | 156/311 |
| 2,804,418 | 8/1957 | King | 156/242 |
| 3,870,594 | 3/1975 | Kudo | 156/313 |
| 4,552,792 | 11/1985 | Julian et al. | 156/228 |
| 4,942,084 | 7/1990 | Prince | 428/537.1 |
| 5,019,199 | 5/1991 | Menke et al. | 264/328.1 |

*Primary Examiner*—Caleb Weston
*Attorney, Agent, or Firm*—Ostrolenk, Faber, Gerb & Soffen

[57] ABSTRACT

The present invention is related to a production method for a composite molded article. The method comprises the steps of: forming a composite wood overlay surface material by laminating a wood veneer on a front side of a base sheet selected from one of a metal sheet and a resin sheet; laminating a back sheet selected from one of a porous material and a fibrous material on a back side of said base sheet; coating said wood veneer incorporated in said composite wood overlay surface material; placing said composite wood overlay surface material in a mold; and injecting a resin onto said back sheet incorporated in said composite wood overlay surface material. Thus, the present invention provides a composite molded article having an excellent appearance of coating on the surface of the article and automation of the coating step is possible.

6 Claims, 1 Drawing Sheet

PRODUCTION METHOD FOR COMPOSITE MOLDED ARTICLE

BACKGROUND OF THE INVENTION

1. Field of the Invention

The present invention relates to production methods for a composite molded article comprising a composite wood overlay surface material and a synthetic resin. The production method of a composite molded article according to the present invention provides an excellent appearance of coating on the composite molded article by the production steps of firstly coating a wood veneer included in the composite wood overlay surface material, and then injecting the synthetic resin.

2. Description of the Related Art

Composite molded articles having grain patterns comprising a composite wood overlay surface material and a synthetic resin have been used widely in the interiors of cars, for furniture, and for electric appliances.

In order to produce composite molded articles having wood grain patterns, a composite wood sheet (such as a wood veneer backed by a sliced wooden veneer, a plywood, an unwoven fabric, or the like) as a surface material, has been employed in a production method comprising the steps of placing the surface material in a mold, injection-molding thereinto a synthetic resin which is to be a core material, and then coating the surface material.

The composite molded articles produced according to the aforementioned method are superior in appearance. However, when the form of the composite molded articles is complicated, inferior units are often produced due to the cracking of the surface material of the composite wood sheet.

In order to avoid the production of such inferior units, a method was developed comprising a step of placing, in a mold, a surface material composed of an aluminum sheet laminated on the back of the wood veneer. According to this method, the products have beautiful grain patterns and the production of inferior units can be avoided since the wood veneer is backed by the aluminum sheet. However, this method requires time and labor because the step of finish-coating on the curved surface of the composite molded article is not amendable to automation of the coating step.

SUMMARY OF THE INVENTION

The object of the present invention is to provide production methods for a composite molded article comprising a composite wood overlay surface material and a synthetic resin, having an excellent appearance of coating on the surface of the composite molded article, by coating a flat surface of the composite wood overlay surface material before molding; therefore, automation of the coating step is possible.

The aforementioned object is achieved by the steps of: coating the wood veneer composing the composite wood overlay surface material (the coating step may include the sub-steps of, for example, a preparatory treatment, a bottom coating application, one or more middle coating applications, and an upper coating application); placing the composite wood overlay surface material in the mold; and injection-molding the synthetic resin thereinto.

According to the present invention, there is provided a production method for a composite molded article, the method comprising the steps of:

forming a composite wood overlay surface material by laminating a wood veneer on a front side of a base sheet selected from one of a metal sheet and a resin sheet; laminating a back sheet selected from one of a porous material and a fibrous material on a back side of said base sheet;

coating said wood veneer incorporated in said composite wood overlay surface material;

placing said composite wood overlay surface material in a mold; and injecting a resin onto said back sheet incorporated in said composite wood overlay surface material.

The production method of a composite molded article according to the present invention enables the coating of a flat surface of the composite wood overlay surface material before molding, and accordingly, an excellent appearance of coating can be obtained, and the automation of the coating step is possible. Furthermore, when an open-pore treatment is carried out, the appearance of the thus-treated composite molded article of the present invention is superior to that of an open-pore-treated article by an ordinary method of applying coating, since the surface of the wood veneer is pressed against the mold by pressure from the injection-molding, and therefore, a smooth texture of the surface and a sharp appearance of the wood grain are obtained.

DETAILED DESCRIPTION OF THE PREFERRED EMBODIMENTS

Figure 1:
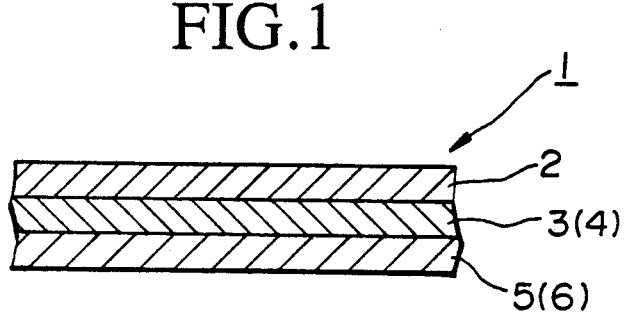
FIG. 1 is a sectional view of a composite wood overlay surface material.

FIG. 1 shows a composite wood overlay surface material 1 which is an integrated sheet composed of a metal sheet 3 or a resin sheet 4, one side of which is laminated on a wood veneer 2, and the other side of which is laminated on a porous material 5 or fibrous material 6.

The metal sheet 3 may be of aluminum, steel, or copper, and may be formed as a sheet with a thickness between 0.01 and 0.5 mm. It is particularly preferred that the thickness of the metal sheet 3 be between 0.1 and 0.3 mm. Also, it is preferred that the metal sheet 3 be chemically pretreated in order to enhance its corrosion resistance and adhesion. A resin sheet 4 may be used in place of the metal sheet 3 depending on the use of the composite wood overlay surface material. The resin sheet may be of thermoplastic or thermosetting resin, or of any other type of resin.

The material for the wood veneer 2 is not specified, however, a wood having a beautiful grain pattern is desirable. The thickness of the wood veneer 2 may preferably be between 0.15 and 0.5 mm, and more specifically, may be approximately 0.2 mm.

A wood veneer or a foam resin plate may be used as a porous material 5. The thickness of the porous material 5 must be in a range where the composite wood overlay surface material 1 can be appropriately shaped; however, the thickness of the porous material 5 is not specifically limited.

A fibrous material 6 may be use in place of the porous material 5. A non-woven fabric, a paper, or a glass-fiber mat may be used as the fibrous material 6. The thickness of the fibrous material 6 must be in a range where the composite wood overlay surface material 1 can be appropriately shaped; however, the thickness of the porous material 5 is not specifically limited. It is preferred that the weight per unit area of the fibrous material 6 be from 30 to 70 g/m².

The components of the composite wood overlay surface material, namely the wood veneer 2, metal sheet 3 (or resin sheet 4 in place of the metal sheet 3), and porous material 5 (or fibrous material 6 in place of porous material 5), are combined by using an adhesive agent in order to form a composite wood overlay surface material. The adhesive agent is not specifically limited, however, since a molten synthetic resin is injection-molded on the composite wood overlay surface material 1 in a later process, it is preferred that a heat-resistant thermosetting adhesive agent such as an epoxy or urethane adhesive agent be applied so that the composite wood overlay surface material 1 will not be deteriorated by heat; and it is preferred that after applying the adhesive agent, the components of the composite wood overlay surface material be bonded together by pressing and heating.

Subsequently, the wood veneer 2, included in the thus-obtained composite wood overlay surface material 1, is coated. The method for coating is not specifically limited; however the process of coating may include the steps of ground-polishing, wash-coating, stain-coating, priming, polishing, bottom-coating, middle-coating, upper-coating, and polishing. A material for coating may be any coating material conventionally used for coating wood, such as a cellulose-based, an acryl-based, a polyurethane-based, a melamine-based, an alkyd-based, and an unsaturated polyester-based coating. A powder coating using a powdered epoxy-based coating and the like may be carried out. It is preferred that open-pore treatment be carried out, wherein the primer coating is not applied in order to retain the excellent appearance of the natural wood patterns.

Figure 2:
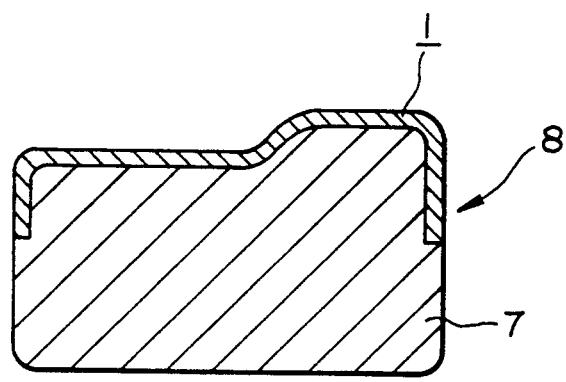
FIG. 2 is a sectional view of a composite molded article formed by injecting a synthetic resin in a mold for injection-molding.

Subsequently, the thus-coated composite wood overlay surface material 1 is placed in a mold for injection-molding, and a synthetic resin 7 such as polypropylene or an ABS resin is injected thereinto. Accordingly, the composite wood overlay surface material 1 is molded along the shape of the mold in order to obtain a desired shape, and at the same time, the composite wood overlay surface material 1 and the synthetic resin 7 are combined to form a unitary body of a molded article. By releasing this molded article from the mold, a composite molded article 8 as shown in FIG. 2 is obtained. Further overcoating may be carried out after molding.

According to the present invention, a composite molded article 8 may also be obtained by coating the composite wood overlay surface material 1, preliminarily molding (forming) the composite wood overlay surface material, placing the composite wood overlay surface material 1 in the mold for injection-molding, and injection-molding the synthetic resin 7 thereinto. In the preliminary molding, the parts on the composite wood overlay surface material, whereof the shape is changed largely by molding, is preliminarily molded by a method such as press working.

By coating a flat surface of the wood veneer 2 (included in the composite wood overlay surface material 1), the above-described production methods allow the automation of the coating process and allow efficient production. Furthermore, when an open-pore treatment is carried out, the appearance of the thus-treated composite molded article of the present invention is superior to that of an open-pore-treated article by an ordinary method of applying coating, since the surface of the wood veneer is pressed against the mold by pressure from the injection-molding, and therefore, a smooth texture of the surface and a sharp appearance of vessels are obtained. Furthermore, the production method wherein the composite wood overlay surface material is preliminarily molded allows the production of a composite molded article 8 having a complex shape.

EXAMPLE

A composite wood overlay surface material 1, having three layers, was formed by combining a wood veneer (whereof the thickness is 0.2 mm) on each of the front side and the back side of a chemically pretreated aluminum sheet (whereof the thickness is 0.3 mm), as a metal sheet 3, by using an adhesive agent so as to form a unitary body; the wood veneer on the front side was used as a wood veneer 2, and the wood veneer on the back side was used as a porous material 5.

A crosslinkable urethane dispersion adhesive agent was used as the adhesive agent. An open-pore coating (thin coating) application was carried out on a surface of the wood veneer 2 situated on the front side of the composite wood overlay surface material 1 by an open-pore coating method. For the open-pore coating, a preparatory treatment was performed by polishing with sandpaper (#240), coloring was applied by wiping using a colored urethane resin, and an undercoating was applied using a urethane clear paint.

The composite wood overlay surface material 1 was placed in a mold for injection-molding, and an ABS resin was injected thereinto and a molded article was formed. In the thus-obtained molded article, the composite wood overlay surface material 1 and the resin 7 form a unitary body. A smooth texture of the surface and a sharp appearance of wood grain are obtained since the surface of the wood veneer is pressed against the mold by pressure during the injection-molding.

What is claimed is:

1. A production method for a composite molded article, the method comprising the steps of:
   (a) forming a composite wood overlay surface material by laminating a wood veneer on a front side of a base sheet selected from a group consisting of a metal sheet and a resin sheet; laminating a back sheet, constructed of material selected from a group consisting of a porous material and a fibrous material, on a back side of said base sheet;
   (b) coating said wood veneer incorporated in said composite wood overlay surface material;
   (c) placing said composite wood overlay surface material in a mold; and
   (d) injecting a resin onto said back sheet incorporated in said composite wood overlay surface material.

2. A production method for a composite molded article as set forth in claim 1 further comprising, between steps (b) and (c), the step of:
   preliminarily molding said composite wood overlay surface material.

3. A production method for producing a composite molded article, said method including the steps of:
   (a) forming a composite wood overlay surface material by adhesively bonding a wood veneer overlay to a base sheet on its front surface and adhesively bonding a back sheet to said base sheet on its rear surface;

(b) coating said wood veneer overlay while said surface material is flat;

(c) thereafter placing the surface material in a mold; and (d) forming a resin component and joining same with said composite wood overlay surface material by injecting a synthetic resin under pressure into said mold and directing said resin against said back sheet to impregnate same.

4. A production method for a composite molded article according to claim 3 further comprising:

selecting said base sheet from one sheet of a group consisting of a metal sheet and a resin sheet, before the step (a).

5. A production method for producing a composite molded article as set forth in claim 3 further including, between steps (b) and (c), the following step:

(e) preliminarily forming said surface material and placing the preliminarily formed surface material in the mold with said wood veneer overlay adjacent an interior surface of the mold so that said synthetic resin under pressure impregnates and exerts a force that urges said surface material against said interior surface.

6. A production method for a composite molded article according to claim 3 further comprising:

selecting said back sheet from one material of a group consisting of a porous material and a fibrous material, before the step (a).

* * * * *